(12) United States Patent
Rakus et al.

(10) Patent No.: US 10,992,126 B2
(45) Date of Patent: Apr. 27, 2021

(54) CIRCUIT INTERRUPTER INSTALLATION AND ASSOCIATED METHOD

(71) Applicant: EATON INTELLIGENT POWER LIMITED, Dublin (IE)

(72) Inventors: Paul R. Rakus, Moon Township, PA (US); James Leo Lagree, Robinson Township, PA (US); Zhi Gao, Chapel Hill, NC (US); Ronald Dale Hartzel, Butler, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 174 days.

(21) Appl. No.: 16/193,254

(22) Filed: Nov. 16, 2018

(65) Prior Publication Data

US 2020/0161850 A1 May 21, 2020

(51) Int. Cl.
*H02H 3/16* (2006.01)
*H02H 1/00* (2006.01)
*H02H 3/04* (2006.01)

(52) U.S. Cl.
CPC .......... *H02H 3/165* (2013.01); *H02H 1/0007* (2013.01); *H02H 1/0092* (2013.01); *H02H 3/04* (2013.01)

(58) Field of Classification Search
CPC ........ H02H 3/04; H02H 3/165; H02H 1/0007; H02H 1/0092
See application file for complete search history.

(56) References Cited

U.S. PATENT DOCUMENTS

2010/0007447 A1  1/2010  Mernyk
2016/0216306 A1*  7/2016  Weiher ................... G01R 31/52

FOREIGN PATENT DOCUMENTS

EP  0 905 849 A1  3/1999
GB  2 518 733 A  4/2015

OTHER PUBLICATIONS

European Patent Office, "Extended European Search Report", corresponding EP application No. 19208199.0, dated Mar. 17, 2020, 8 pp.

* cited by examiner

*Primary Examiner* — Rafael O De Leon Domenech
(74) *Attorney, Agent, or Firm* — Eckert Seamans Cherin & Mellott, LLC (57) ABSTRACT

A method involves a circuit interrupter installation having a circuit interrupter with a plurality of poles and an ETU electrically connected with a neutral current sensor situated in proximity to a neutral conductor. The method includes determining that a plurality of fundamental frequency phase current vectors, when summed, are substantially equal to a fundamental frequency neutral current vector, and/or that a plurality of triplen odd-numbered harmonic phase current vectors, when summed, are substantially equal to a triplen odd-numbered harmonic neutral current vector. Responsive to the determining, the method includes outputting a notification which represents a possibility that a neutral current detection apparatus is mis-wired, and/or employing with the ETU a reverse vector that is an opposite of the fundamental frequency neutral current vector in the ongoing monitoring for an event that would trigger the movement of the circuit interrupter from the ON condition to the OFF or TRIPPED condition.

17 Claims, 5 Drawing Sheets

CIRCUIT INTERRUPTER INSTALLATION AND ASSOCIATED METHOD

BACKGROUND

Field

The disclosed and claimed concept relates generally to a circuit interrupter installation and, more particularly, to a circuit interrupter installation and an associated method for detecting that a neutral current detection apparatus of the circuit interrupter installation is potentially erroneously installed and for responding to such a determination.

Related Art

Numerous types of circuit interruption devices are known in the relevant art. Circuit interruption devices are connected with protected portions of circuits and provide protection for various predefined conditions such as overcurrent conditions, under-voltage conditions, ground fault conditions, and other conditions, without limitation. While some circuit interrupters are single phase devices having a single pole, other circuit interrupters are multi-phase devices that include a plurality of poles. In a multi-pole circuit interrupter, each pole typically includes its own set of separable contacts, and a crossbar extends among the sets of separable contacts to simultaneously operate them between a CLOSED condition and an OPEN condition. The crossbar is typically operated by a trip unit which triggers the crossbar to move the sets of separable contacts from the CLOSED condition to the OPEN condition in response to any of a variety of predetermined conditions that are detected by the circuit interrupter. For instance, each phase or pole of the circuit interrupter may have an associated phase current sensor such as a current transformer, Rogowski coil, or the like that is placed in proximity to the phase conductor of the pole. Each such current sensor is wired directly to a trip unit, such as an Electronic Trip Unit (ETU), by way of example, to provide information to the trip unit regarding the current flowing in each of the phases of the circuit interrupter. If the trip unit detects a predetermined condition that warrants moving of the circuit interrupter from an ON condition to an OFF or TRIPPED condition, the trip unit triggers the crossbar to move the sets of separable contacts from the CLOSED condition to the OPEN condition.

In certain three-phase circuit interruption applications, a neutral conductor that is connected with the protected portion of the circuit is not broken when the circuit interrupter is switched from the ON to the OFF or TRIPPED conditions. However, it is still desirable for the trip unit, i.e., the ETU or other trip unit, by way of example, to monitor the current flow in the neutral conductor. In such a situation, a neutral current sensor, such as another current transformer, another Rogowski coil, or the like, is placed into proximity with the neutral conductor, and a pair of leads from the neutral current sensor are electrically connected with the trip unit. However, such an installation of a neutral current sensor typically will occur in the field and potentially may be mis-wired. That is, while the phase current sensors are installed into the circuit interrupter in the factory and thus undergo a quality assurance evaluation and therefore can be assumed to be wired correctly when the circuit interrupter leaves the factory, the installation of the neutral current sensor in connection with the circuit interrupter cannot be assumed to be correctly wired.

For example, the pair of leads from the neutral current sensor may be reverse-wired to the trip unit. Alternatively, the pair of leads from the neutral current sensor may be correctly wired to the trip unit, but the coil portion of the neutral current sensor may be mounted backward on the circuit interrupter, such as on the housing thereof. Still alternatively, the neutral current sensor may be properly placed into proximity with the neutral conductor, but the neutral conductor may be wired in a backward fashion with respect to the coil of the neutral current sensor. If any one of the three incorrect wiring scenarios exists in a circuit interrupter installation, the trip unit will detect as the neutral current something other than what is actually flowing through the neutral conductor. The result can be that the trip unit may erroneously trigger the circuit interrupter to move from the ON condition to the OFF or TRIPPED condition based on an incorrect reading of the neutral current and due to its algorithms erroneously detecting a trip event when no such trip event actually exists in the circuit. Improvements thus would be desirable.

SUMMARY

Accordingly, an improved method involves a circuit interrupter installation having a circuit interrupter that includes a plurality of poles and an ETU, with the ETU being electrically connected with a neutral current sensor situated in proximity to a neutral conductor. The method includes determining that a plurality of fundamental frequency phase current vectors, when summed, are substantially equal to a fundamental frequency neutral current vector, and/or that a plurality of triplen odd-numbered harmonic phase current vectors, i.e., $3^{rd}$ harmonic, $9^{th}$ harmonic, $15^{th}$ harmonic, etc., when summed, are substantially equal to a triplen odd-numbered harmonic neutral current vector. Responsive to the determining, the method includes outputting a notification which represents a possibility that a neutral current detection apparatus is mis-wired, and/or employing with the ETU a reverse vector that is an opposite of the fundamental frequency neutral current vector in the ongoing monitoring for an event that would trigger the movement of the circuit interrupter from the ON condition to the OFF or the TRIPPED condition.

Accordingly, an aspect of the disclosed and claimed concept is to provide an improved method of detecting that an aspect of a neutral current detection apparatus of a circuit interrupter installation may be incorrectly installed.

Another aspect of the disclosed and claimed concept is to provide an improved method of responding to a determination that an aspect of the neutral current detection apparatus of a circuit interrupter installation may be incorrectly installed.

Another aspect of the disclosed and claimed concept is to provide an improved method of providing a remedy in response to a determination that an aspect of a neutral current detection apparatus of a circuit interrupter installation may be incorrectly installed by employing with an ETU a reverse vector that is an opposite of a fundamental frequency neutral current vector that is actually detected with the neutral current detection apparatus.

Another aspect of the disclosed and claimed concept is to provide an improved circuit interrupter having any one or more of the aforementioned aspects.

Accordingly, an aspect of the disclosed and claimed concept is to provide an improved method whose general nature can be stated as including, in a circuit interrupter installation having a plurality of poles, a neutral conductor, and an Electronic Trip Unit (ETU), determining that at least one of a plurality of fundamental frequency phase current vectors are, when summed, substantially equal to a fundamental frequency neutral current vector, and a plurality of odd-numbered harmonic phase current vectors are, when summed, substantially equal to an odd-numbered harmonic neutral current vector. The method can be generally stated as further including, responsive to the determining, performing at least one of outputting a notification that is representative of a possibility that one of the neutral conductor and a neutral current sensor is wired backward in the circuit interrupter installation, and employing with the ETU a reverse vector that is an opposite of the fundamental frequency neutral current vector.

Another aspect of the disclosed and claimed concept is to provide an improved circuit interrupter on which the aforementioned method may be performed.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
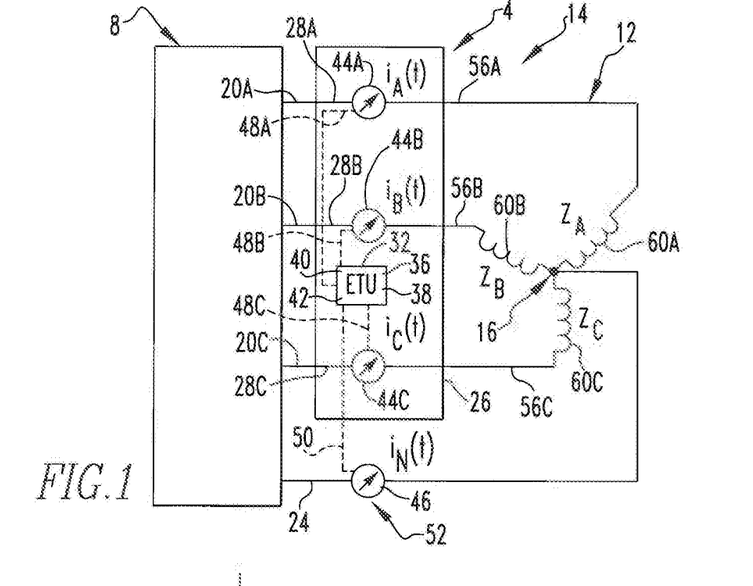
FIG. 1 is a schematic depiction of a correctly wired circuit interrupter installation that is connected with a source and that includes an improved circuit interrupter in accordance with the disclosed and claimed concept.

An improved circuit interrupter 4 in accordance with the disclosed and claimed concept is depicted generally in FIG. 1. The circuit interrupter 4 is depicted as being electrically connected with a source 8, which is a source of three-phase electrical power, and as further being connected with a protected portion of a circuit 12. The connection of the circuit interrupter 4 with the source 8 and the circuit 12 can be referred to as a circuit interrupter installation 14. The circuit 12 includes a load 16 which, in the depicted exemplary embodiment, is a three-phase load and receives electrical power from the source 8.

The source 8 can be said to include a plurality of phase line conductors that are indicated at the numerals 20A, 20B, and 20C, and which may be collectively or individually referred to herein with the numeral 20. The source 8 further includes a neutral conductor 24.

The circuit interrupter 4 can be said to include a housing 26 and a plurality of poles that are situated on the housing 26 and that are indicated at the numerals 28A, 28B, and 28C, and which may be collectively or individually referred to herein with the numeral 28. The circuit interrupter 4 further includes an Electronic Trip Unit (ETU) 32 that includes a processor apparatus 36. The processor apparatus 36 can be said to include a processor 38 and a storage 40. The processor 38 can be any of a wide variety of processors, including a microprocessor or other processor, and the storage 40 can be any of a wide variety of electronic storage media such as any one or more of RAM, ROM, EPROM, FLASH, and the like and is in the nature of a non-transitory computer readable storage medium. The storage 40 has a number of routines 42 stored therein that are executable on the processor 38 to cause the circuit interrupter 4 to perform certain operations such as are set forth elsewhere herein. As employed herein, the expression "a number of" and variations thereof shall refer broadly to any non-zero quantity, including a quantity of one.

The circuit interrupter 4 further includes a plurality of phase current sensors that are indicated at the numerals 44A, 44B, and 44C, and which may be collectively or individually referred to herein with the numeral 44. The phase current sensors 44A, 44B, and 44C are each situated proximate a corresponding conductive structure which, in the depicted exemplary embodiment, is a corresponding one of the phase line conductors 20A, 20B, and 20C, respectively, or a conductor that is electrically connected therewith.

The circuit interrupter installation 14 further includes a neutral current sensor 46 that is situated proximate the neutral conductor 24. In the depicted exemplary embodiment, the neutral current sensor 46 is not installed at the factory where the circuit interrupter 4 was manufactured, and rather is installed in the field. This may occur in an aftermarket setting, for example. The phase current sensors 44A, 44B, and 44C each include a coil and further include a pair of phase sensor leads that are indicated at the numerals 48A, 48B, and 48C, and which may be collectively or individually referred to herein with the numeral 48. Since the installation of the phase current sensors 44 occurs in the factory where the circuit interrupter 4 was manufactured, the pairs of phase sensor leads 48 are each electrically connected with the ETU 32, and they are correctly wired with the ETU 32 inasmuch as such correctness is confirmed during a quality assurance test on the circuit interrupter 4 before it leaves the factory. The neutral current sensor 46 includes a coil and a pair of neutral sensor leads 50 that are likewise electrically connected with the ETU 32. The routines 42 on an ongoing basis evaluate the inputs received from the phase current sensors 44 and the neutral current sensor 46 and use such inputs to determine whether a predetermined condition exists in the circuit 12 which would require the ETU 32 to trigger the poles to move from the ON condition to the OFF or TRIPPED condition.

However, since the neutral current sensor 46 is installed in the field and the pair of neutral sensor leads 50 are likewise electrically connected with the ETU 32 in the field, the correctness of the installation of the neutral current sensor 46 within the circuit interrupter installation 14 typically cannot be guaranteed or even assumed.

That is, the neutral conductor 24, the coil of the neutral current sensor 46, and the neutral sensor leads 50 can together be referred to as a neutral current detection apparatus 52 of the circuit interrupter installation 14. If the neutral current detection apparatus 52 is installed properly, the ETU 32 will correctly detect from the neutral current sensor 46 the current that flows in the neutral conductor 24. However, it is possible, due to the field installation of the neutral current sensor 46, that the pair of neutral sensor leads 50 may be reverse-wired to the ETU 32, or that the coil of the neutral current sensor 46 is installed backward with respect to the neutral conductor 24, or that the neutral conductor 24 is installed backward with respect to the neutral current sensor 46. If any one of these mis-installation situations exist with the circuit interrupter installation 14, the ETU 32 will detect something other than the current that is actually flowing through the neutral conductor 24, which is a situation that will be described in greater detail below.

As can be understood from FIG. 1, the circuit 12 can be said to include a plurality of phase load conductors 56A, 56B, and 56C, and which may be collectively or individually referred to herein with the numeral 56, that are electrically connected with the load 16. As can be further understood from FIG. 1, the load 16 can be said to include a plurality of load components $Z_A$, $Z_B$, and $Z_C$ that are indicated at the numerals 60A, 60B, and 60C, and which may be collectively or individually referred to herein with the numeral 60. The load components 60A, 60B, and 60C are electrically connected with the phase load conductors 56A, 56B, and 56C, respectively.

Figure 2:
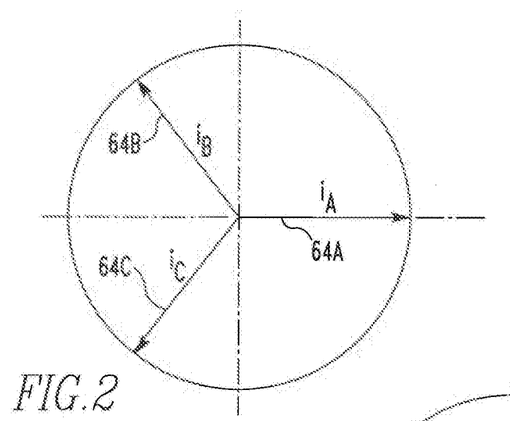
FIG. 2 is an exemplary vector diagram of current vectors ($i_A$, $i_B$, and $i_C$) of the circuit interrupter installation of FIG. 1 wherein a load of the circuit interrupter installation is balanced.
Figure 2A:
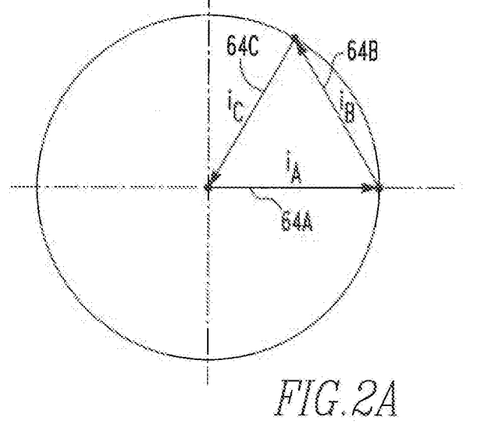
FIG. 2A is depiction of the current vectors ($i_A$, $i_B$, and $i_C$) being summed together.

When the load components 60 are balanced, the current flowing through the poles 28, and which is detected by the phase current sensors 44 and input via the pairs of phase sensor leads 48 to the ETU 32, can be depicted in graphical form as represented by three fundamental frequency phase current vectors ($i_A$, $i_B$, and $i_C$), as in FIG. 2, which may also be referred to herein as phase vectors, and which are indicated at the numerals 64A, 64B, and 64C, and which may be collectively or individually referred to herein with the numeral 64. When the load components 60 are balanced with one another, the resultant phase vectors 64 are as indicated in FIG. 2, meaning that they are each of the same magnitude and are situated 120° apart from one another. In such a situation, current flowing in the neutral conductor 24 at the fundamental frequency (which, in North America, is 60 Hz) is zero. Furthermore, the neutral vectors 64 from FIG. 2 together sum to zero or substantially zero, as is indicated in FIG. 2A.

Figure 3:
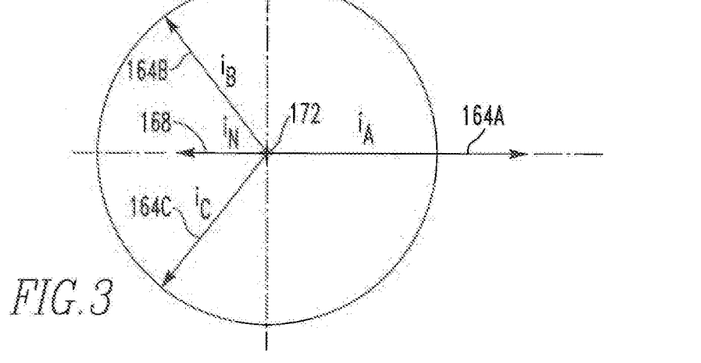
FIG. 3 is another vector diagram similar to FIG. 2, except depicting current vectors ($i_A$, $i_B$, $i_C$, and $i_N$) when the load is in an unbalanced state.

However, if the load components 60 are not balanced with one another, this can result in the graph depicted generally in FIG. 3 wherein, by way of example, the fundamental frequency phase current vectors ($i_A$, $i_B$, and $i_C$) are indicated generally at the numerals 164A, 164B, and 164C, and wherein the fundamental frequency phase current vector 164A is of a greater magnitude than the fundamental frequency phase current vectors 164B and 164C. Moreover, a fundamental frequency neutral current vector 168 ($i$) exists, meaning that current at the fundamental frequency flows in the neutral conductor 24. It is reiterated that the graph in FIG. 3, as is the case with the graph in FIG. 2, depicts the phase current vectors at the fundamental frequency which, in North America, is 60 Hz.

Figure 4:
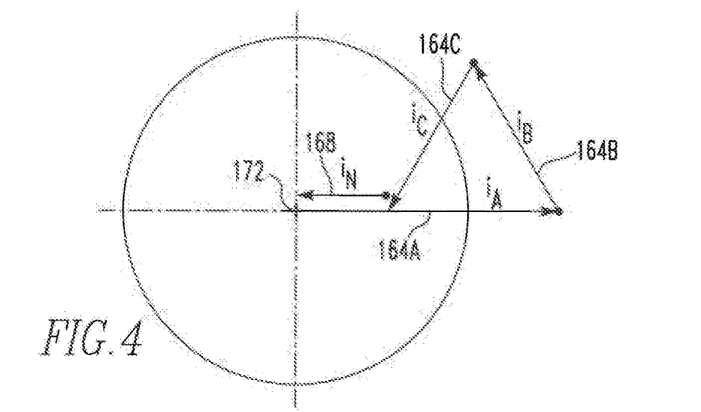
FIG. 4 is another vector diagram that includes a graphical depiction of a summing of the vectors that are depicted in FIG. 3 which, when summed, equal substantially zero by depicting the vectors originating at and returning substantially to an origin of the graph.

FIG. 4 depicts the phase vectors 164A, 164B, and 164C and the neutral vector 168 being summed to be substantially zero, meaning for example that the fundamental frequency phase current vector 164A begins at an origin 172 and that the fundamental frequency phase current vectors 164B and 164C and the fundamental frequency neutral current vector 168 being summed with the phase vector 164A results in substantially zero, meaning that the neutral vector 168 returns substantially to the origin 172. In this regard, it is noted that the neutral vector 168 is depicted in FIG. 4 offset slightly above the phase vector 164A for purposes of visual clarity. The summing of the fundamental frequency phase current vectors 164A, 164B, and 164C and the fundamental frequency neutral current vector 168 to result in zero or substantially zero, as in FIG. 4, indicates that the circuit interrupter installation 14 is properly wired.

Figure 5:
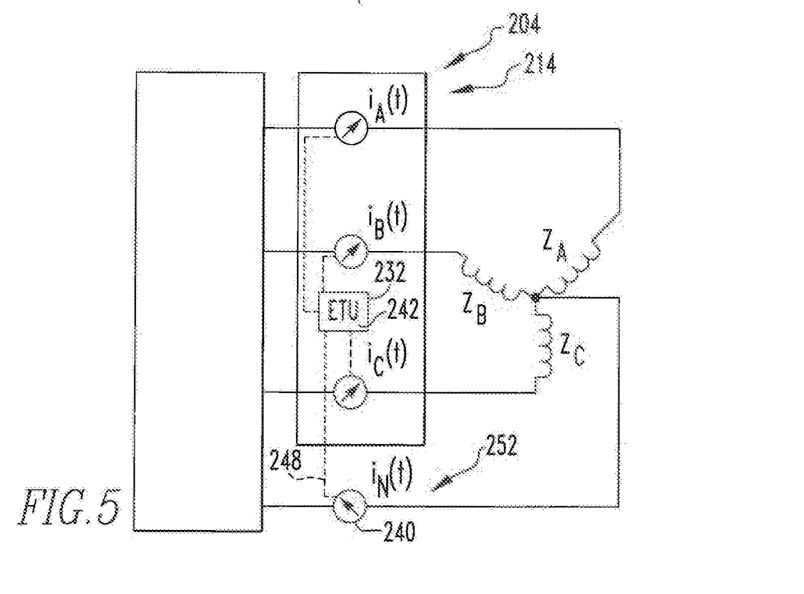
FIG. 5 is a view similar to FIG. 1, except depicting a circuit interrupter installation having a neutral current detection apparatus that is incorrectly installed.

In contrast, another circuit interrupter installation 214 is depicted in FIG. 5 as including a circuit interrupter 204 that is similar to the circuit interrupter 4, except that a neutral current detection apparatus 252 of the circuit interrupter installation 214 is incorrectly installed. The circuit interrupter 204 includes an electronic trip unit 232 to which is connected a pair of neutral sensor leads 248 of a neutral current sensor 240 that is situated in proximity to the neutral conductor 24 of the source 8. However, the neutral current detection apparatus 252 is mis-installed in some fashion. This means that one of the aforementioned mis-installation situations can exist, by way of example. For instance, the pair of neutral sensor leads 248 might be reverse-wired to the ETU 232, the coil of the neutral current sensor 240 may be reverse-positioned with respect to the neutral conductor, or the neutral conductor may be reverse-positioned with respect to the coil of the neutral current sensor 240. Any one of these mis-installations can result in the ETU 232 incorrectly detecting the output from the neutral current sensor 240 as being a correct reflection of the current that is flowing in the neutral conductor 24, which it is not.

Figure 6:
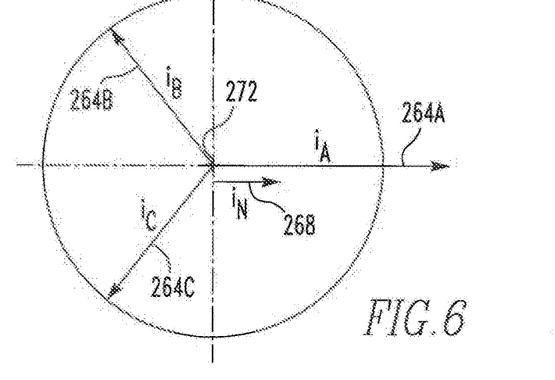
FIG. 6 is a vector diagram of the incorrectly wired circuit interrupter installation of FIG. 5 depicting current vectors ($i_A$, $i_B$, $i_C$, and $i_N$) of an unbalanced load.
Figure 7:
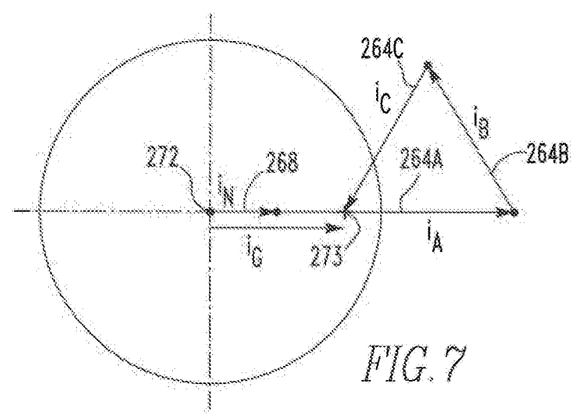
FIG. 7 is a vector diagram depicting a graphical summing of the vectors of FIG. 6 and depicting an erroneous resultant detection of a ground current ($i_G$)

In the situation where the load of the circuit interrupter installation 214 is unbalanced, this can result in an exemplary vector graph such as is depicted generally in FIG. 6 wherein a plurality of fundamental frequency phase current vectors ($i_A$, $i_B$, and $i_C$) are indicated at the numerals 264A, 264B, and 264C, which may be collectively or individually referred to herein with the numeral 264. The fundamental frequency phase current vectors 264 are depicted as being 120° apart from one another, and with the exemplary phase vector 264A being of a greater magnitude than the exemplary phase vectors 264B and 264C. The fundamental frequency phase current vectors 264 that are depicted in FIG. 6 are what is detected by the ETU 232. The ETU 232 further detects a fundamental frequency neutral current vector 268. In this regard, it is noted that the neutral vector 268 is depicted in FIG. 6 offset slightly below the phase vector 264A for purposes of visual clarity. Again, the phase vectors 264 and the neutral vector 268 are each at the fundamental frequency which, in North America, is 60 Hz. As can be understood from FIG. 7, however, when the phase vectors 264 and the neutral vector 268 are summed together, the four vectors do not return to an origin 272 of the graph of FIG. 7. Rather, the ETU 232 is erroneously detecting from the neutral current detection apparatus 252 the opposite of the current that is actually flowing through the neutral conductor 24 since the neutral current detection apparatus 252 is mis-installed. The phase vectors 264 and the neutral vector 268, when summed together, can be said to begin at the origin 272, but end at a different location 273 on the vector graph of FIG. 7. As such, the ETU 232 erroneously detects the summed together phase vectors 264 and the neutral vector 268 that begin at the origin 272 and end at the different location 273 as being indicative of a ground current vector 276 ($i_G$) which does not actually exist. In this regard, it is noted that the ground vector 276 is depicted in FIG. 7 offset slightly below the neutral current vector 268 and the phase vector 264A for purposes of visual clarity.

Since the routines that are executable on the ETU 232 are erroneously predicting the existence of the ground current vector 276 based upon the mis-wired neutral current detection apparatus 252, the ETU 232 might trigger the circuit interrupter 204 to move from its ON condition to its OFF condition or its TRIPPED condition. However, no such tripping is actually needed because the ground current vector 276 that is predicted by the routines is erroneous, it does not actually exist, and the situation detected by the ETU 232 does not correctly reflect the actual conditions of the circuit interrupter 204. That is, the ground current vector 276 does not actually exist and no meaningful ground current actually is flowing in the circuit that is connected with the circuit interrupter 204.

Figure 8:
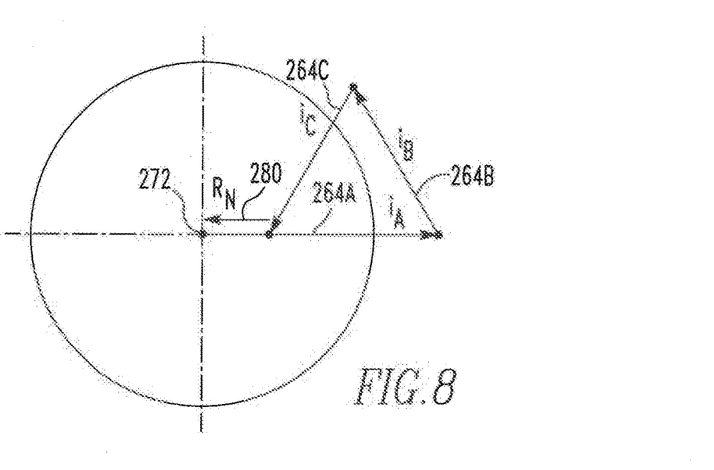
FIG. 8 is another vector diagram depicting a graphical summing of the three fundamental frequency phase current vectors ($i_A$, $i_B$, and $i_C$) of FIG. 7 together with a reverse vector ($R_N$) to result in substantially zero by starting at and returning substantially to an original of the graph of FIG. 8, despite the circuit interrupter installation of FIG. 5 having a neutral current detection apparatus that is erroneously installed.

Advantageously, therefore, the routines 242 that are executable on the ETU 232 can additionally calculate a reverse vector 280 that is the opposite of the detected fundamental frequency neutral current vector 268, and the routines 242 can then sum the fundamental frequency phase current vectors 264 with the reverse vector 280 to see if they sum substantially to zero, i.e., return essentially to the origin 272 when graphically summed together. That is, when the ground current vector 276 is predicted by the ETU 232 to exist, and before the ETU 232 triggers the circuit interrupter 204 to move from its ON condition to its OFF condition or its TRIPPED condition the routines 242 responsively calculate the reverse vector 280 and sum it with the fundamental frequency phase current vectors 264 to see if they sum substantially to zero. For instance, and as can be seen in FIG. 8, when the phase vectors 264 are summed together with the reverse vector 280 in place of the neutral vector 268, it being reiterated that the reverse vector 280 is the opposite of the neutral vector 268, the result is substantially zero, meaning that the summed vectors in FIG. 8 return substantially to the origin 272 from which the phase vector 264A originates. In this regard, it is noted that the reverse vector 280 is depicted in FIG. 8 offset slightly above the phase vector 264A for purposes of visual clarity.

In the situation depicted generally in FIG. 8, the routines 242 on the ETU 232 have determined that the phase vectors 264, when summed with the reverse vector 280 instead of the neutral vector 268, result in a sum of substantially zero. The routines 242 advantageously therefore conclude that the neutral current detection apparatus 252 potentially may be mis-installed within the circuit interrupter installation 214. Advantageously, therefore, the routines 242 may initiate the outputting of a notification that is representative of a possibility that the neutral current detection apparatus 252 is somehow erroneously installed within the circuit interrupter installation 214. Such a notification can be in the form of a visible or audible output on the circuit interrupter 204 itself, by way of example. Alternatively or additionally, the notification could be in the form of an input to another device which can then provide a more express output to a technician, such as a textual message that the neutral current detection apparatus is potentially mis-installed. Such a message can additionally or alternatively be output on a visual display that is situated on the circuit interrupter 204, by way of further example. Other examples of such a notification will be apparent.

Additionally or alternatively, the ETU 232 can simply perform its ongoing analysis of the circuit interrupter installation 214 by using the fundamental frequency phase current vectors 264 and further with the use of the reverse vector 280 in place of the fundamental frequency neutral current vector 268. That is, the ETU 232 on an ongoing basis can constantly calculate a new reverse vector 280 that is the opposite of the measured fundamental frequency neutral current vector 268 and can sum such reverse vector 280 with the measured fundamental frequency phase current vectors 264, i.e., on an ongoing basis, to see if a pre-established condition exists in the circuit that would warrant tripping of the circuit interrupter 204. In other words, the ETU 232 would continue its monitoring of the circuit by monitoring its various inputs, but instead of employing the detected neutral vector 268, it would employ the opposite of whatever is detected as the neutral vector 268, i.e., it would calculate a reverse vector 280 thereof; and would employ the reverse vector 280 in its operations in place of the neutral vector 268.

By outputting the notification that is representative of the potential that the neutral current detection apparatus 252 is mis-installed, this gives to the customer, i.e., the owner of the circuit interrupter installation 214, an opportunity to evaluate the neutral current detection apparatus 252 and to potentially correct the mis-installation thereof. By employing the reverse vector 280 on an ongoing basis, this would give the ETU 232 the opportunity to ignore the mis-wiring of the neutral current detection apparatus 252 and to continue to carry on with constantly evaluating the circuit interrupter installation 214. Such evaluation would be based upon an update, i.e., a correction, to the input that is received from the neutral sensor leads 248 at the ETU 232 to compensate for the fact that the neutral current detection apparatus 252 is mis-installed. Such action could occur automatically upon detection of the ground current vector 276. Further alternatively, the notification that is provided to the customer that is representative of the potential mis-installation of the neutral current detection apparatus 252 may additionally give to the customer the option for the ETU 232 to ignore such mis-installation or to not ignore it. That is, the notification may give to the customer the opportunity to instruct the ETU to employ the reverse vector 280 in place of the neutral vector 268 on an ongoing and permanent basis, or to continue to employ the measured neutral vector 268. Enabling the ETU 232 to effectively ignore the mis-installation of the neutral current detection apparatus 252 is advantageous in situations wherein the circuit interruption installation 214 cannot easily be shut down to correct the potential mis-installation. Other variations will be apparent.

Figure 9A:
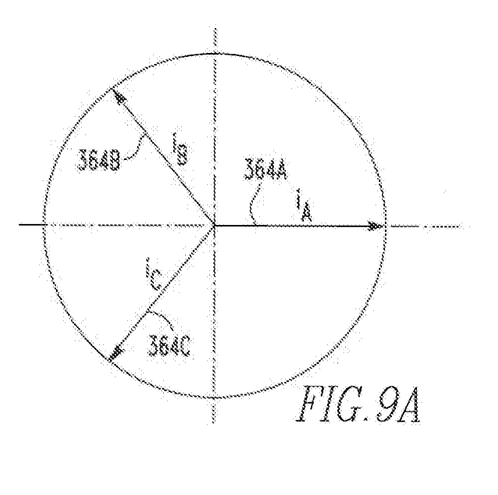
FIG. 9A is a view similar to FIG. 2 and again depicts in a graphical fashion the three fundamental frequency phase current vectors ($i_A$, $i_B$, and $i_C$)) of the correctly wired circuit interrupter installation of FIG. 1 when the load is balanced.

It is reiterated that the foregoing, including that depicted in FIGS. 2-4 and 6-8, is in the realm of the fundamental frequency which, in North America, is 60 Hz. It is also reiterated that the reverse vector 280 is described herein as being the opposite of the fundamental frequency neutral current vector 268. It thus can be understood that the fundamental frequency current in the neutral conductor 24 likely is zero when the load is perfectly balanced, such as is depicted in FIG. 9A. That is, FIG. 9A depicts the fundamental frequency vectors of a balanced load wherein the circuit interrupter installation is properly wired, such as with the circuit interrupter installation 14, meaning that FIG. 9A and FIG. 2 depict the same situation. In FIG. 9A, a set of fundamental frequency phase current vectors $i_A$, $i_B$, and $i_C$ that are indicated at the numerals 364A, 364B, and 364C are each of the same magnitude and are situated 120° apart from one another. Again, this is in the realm of the fundamental frequency. Since the load in FIG. 9A is balanced, neutral current at the fundamental frequency is zero, hence FIG. 9A does not depict any existence of fundamental frequency neutral current vectors.

Figure 9B:
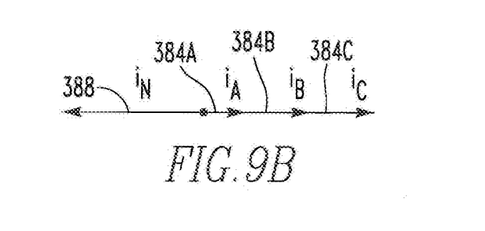
FIG. 9B is a graphical depiction of three third harmonic frequency phase current vectors ($i_A$, $i_B$, and $i_C$) being summed together and in combination with a third harmonic frequency neutral current vector ($i_N$) indicating that the third harmonic frequency current vectors, when summed, are equal and opposite to the third harmonic frequency neutral current vector.

It is noted, however, that currents at triplen odd-harmonic frequencies, e.g., 3rd, 9th, 15th, 21st, etc., harmonics, can be found in the neutral conductor 24 even when the load is balanced. In practice, only third harmonic currents are of significant amplitudes to produce meaningful results. Other triplen odd-harmonic currents are of amplitudes that often are too small to produce meaningful results. FIG. 9B thus depicts a set of exemplary third harmonic frequency phase current vectors $i_A$, $i_B$, and $i_C$ at the numerals 384A, 384B, and 384C, which may be collectively or individually referred to herein with the numeral 384. FIG. 9B further depicts a third harmonic frequency neutral current vector $i_N$ at the numeral 388 as being exactly the opposite of the third harmonic frequency phase current vectors 384 when the third harmonic frequency phase current vectors 384 are summed together. It thus can be understood that the third harmonic frequency phase current vectors 384 and the third harmonic frequency neutral current vector 388 summed together equal zero or substantially zero when the neutral current detection apparatus is correctly installed, as in FIG. 9B.

Currents $i_A(t)$, $i_B(t)$, and $i_C(t)$ contain both fundamental frequency currents, e.g., $f_e$=60 Hz in North America, and harmonic frequency currents, i.e., integer multiples of $f_e$. The third harmonic current, e.g., f=180 Hz in North America, is described in the instant exemplary embodiment, it being understood that other triplen odd-numbered harmonic currents such as 9th harmonic, 15th harmonic, etc., can alternatively or additionally be employed in the evaluation described herein.

In a balanced 3-phase system, assuming a zero initial phase, the currents in each phase are:

$$i_A(t) = I * \cos(2\pi f_e t) + I_A * \cos(3 * 2\pi f_e t)$$

$$i_B(t) = I * \cos(2\pi f_e t - 120°) + I_B * \cos[3 * (2\pi f_e t - 120°)]$$
$$= I * \cos(2\pi f_e t - 120°) + I_B * \cos(3 * 2\pi f_e t)$$

$$i_C(t) = I * \cos(2\pi f_e t + 120°) + I_C * \cos[3 * (2\pi f_e t + -120°)]$$
$$= I * \cos(2\pi f_e t + 120°) + I_C * \cos(3 * 2\pi f_e t)$$

where I is the amplitude of the fundamental component, and where $I_A$, $I_B$, and $I_C$ are the amplitudes of the third harmonic currents for phase A, B and C, respectively.

For a balanced 3-phase system with a correctly-installed neutral current detection apparatus, $i_A(t)+i_B(t)+i_C(t)+i_N(t)=0$ according to Kirchhoff's current law. Therefore, and as is depicted in FIG. 9B, $$i_N(t) = -[i_A(t) + i_B(t) + i_C(t)] =$$
$$-\{I * [\cos(2\pi f_e t) + \cos(2\pi f_e t - 120°) + \cos(2\pi f_e t + 120°)] +$$
$$(I_A + I_B + I_C) * \cos[3 * 2\pi f_e t]\} = -(I_A + I_B + I_C) * \cos(3 * 2\pi f_e t)$$

Figures 10A, 10B:
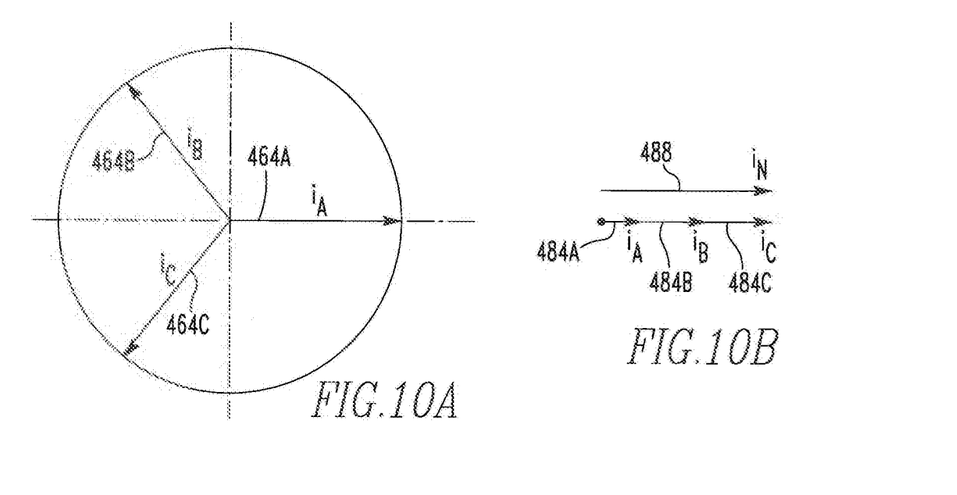
FIG. 10A is a graphical depiction of the three fundamental frequency phase current vectors ($i_A$, $i_B$, and $i_C$) of the incorrectly wired circuit interrupter installation of FIG. 5 when its load is in a balanced state.
FIG. 10B is a graphical depiction of the three third harmonic frequency phase current vectors ($i_A$, $i_B$, and $i_C$) being summed together and further showing a third harmonic frequency neutral current vector ($i_N$) when the load of the circuit interrupter installation of FIG. 5 is in a balanced state yet depicting the three third harmonic frequency phase current vectors, when summed, being equal to the third harmonic frequency neutral current vector.

That is, the neutral current sensor's fundamental frequency current is zero, which is depicted in FIG. 9A wherein the neutral current detection apparatus is correctly installed, and which is also depicted in FIG. 10A wherein the neutral current detection apparatus is mis-installed, i.e., is incorrectly installed. The neutral current sensor's third harmonic current is $-(I_A+I_B+I_C)*\cos(3\cdot 2\pi f_e t)$, as can be understood from FIG. 9B wherein the summed third harmonic phase vectors $i_A+i_B+i_C$ are the opposite of $I_N$.

Similarly, for a balanced 3-phase system with an incorrectly-installed neutral current detection apparatus, $i_A(t)+i_B(t)+i_C(t)\cdot i_N(t)=0$ according to Kirchhoff's current law. Therefore, $$i_N(t) = i_A(t) + i_B(t) + i_C(t) =$$
$$I * [\cos(2\pi f_e t) + \cos(2\pi f_e t - 120°) + \cos(2\pi f_e t + 120°)] +$$
$$(I_A + I_B + I_C) * \cos(3 * 2\pi f_e t) = (I_A + I_B + I_C) * \cos(3 * 2\pi f_e t)$$

Accordingly, in an incorrectly-installed neutral current detection apparatus, the neutral current sensor's fundamental frequency current is zero, as is depicted in FIG. 10A. The neutral current sensor's third harmonic current is $(I_A+I_B+I_C)*\cos(3\cdot 2\pi f_e t)$, as can be understood from FIG. 10B wherein the summed third harmonic phase vectors $i_A+i_B+i_C$ are equal to $i_N$.

More specifically, FIG. 10A depicts a set of fundamental frequency phase current vectors $i_A$, $i_B$, and $i_C$ that are indicated at the numerals 464A, 464B, and 464C and which are each of the same magnitude and are situated 120° apart from one another. This is in the realm of the fundamental frequency. Since the load in FIG. 10A is balanced, neutral current at the fundamental frequency is zero, hence FIG. 10A does not depict any existence of fundamental frequency neutral current vectors.

However, FIG. 10B thus depicts a set of exemplary third harmonic frequency phase current vectors $i_A$, $i_B$, and $i_C$ at the numerals 484A, 484B, and 484C, which may be collectively or individually referred to herein with the numeral 484. FIG. 10B further depicts a third harmonic frequency neutral current vector $i_N$ at the numeral 488 as being equal to the third harmonic frequency phase current vectors 484 when the third harmonic frequency phase current vectors 484 are summed together. In this regard, it is noted that the neutral vector 488 is depicted in FIG. 10B offset slightly above the phase vectors 484 for purposes of visual clarity. It thus can be understood that the third harmonic frequency phase current vectors 484 summed together are substantially equal to the third harmonic frequency neutral current vector 488 when the neutral current detection apparatus is mis-installed, as in FIG. 10B.

An evaluation of such harmonic currents as in FIGS. 9B and 10B thus can provide an indication whether a neutral current detection apparatus is mis-installed even if the loads are perfectly balanced. That is, FIGS. 9A and 10A each depict situations wherein the loads are perfectly balanced and wherein the fundamental frequency current in the neutral conductor is zero, except that FIG. 9A depicts a situation wherein the neutral current detection apparatus is correctly installed, and FIG. 10A depicts a situation wherein the neutral current detection apparatus is mis-installed. An evaluation of the fundamental frequency current vectors thus might not shed light on whether a neutral current detection apparatus is correctly installed or whether the neutral current detection apparatus is mis-installed. However, by evaluating the triplen odd-numbered harmonic current vectors, as the third harmonic current vectors are evaluated in FIGS. 9B and 10B, such potential mis-installation of a neutral current detection apparatus can be identified. For example, and as is depicted in FIG. 9B, if the harmonic frequency phase vectors $i_A$, $i_B$, and $i_C$, when summed, are the opposite of (i.e., the negative of) the harmonic neutral current $i_N$ such that the harmonic phase current vectors and the harmonic neutral current vector together sum to zero or substantially zero, as in FIG. 9B, this would indicate a correctly installed neutral current detection apparatus. On the other hand, if the summed harmonic current vectors $i_A$, $i_B$, and $i_C$ are equal to or substantially equal to the harmonic neutral current vector $i_N$, as in FIG. 10B, this would indicate that the neutral current detection apparatus is mis-installed. Advantageously, therefore, an evaluation of the harmonic current vectors can provide an indication of an incorrectly installed neutral current detection apparatus even if the load components on the three phases of a load are balanced.

Further advantageously, an evaluation of the harmonic current vectors as in FIGS. 9B and 10B can serve as a further evaluation to detect an incorrectly installed neutral current detection apparatus even if, as in FIG. 8, the fundamental frequency current vectors have already indicated to the routines 42 and 242 an existence of a possible mis-installed neutral current detection apparatus. For example, the routines 42 and 242 might be configured such that, as a first step, the reverse vector 280 is calculated and employed to see if it results in a substantially zero sum when used in place of a fundamental frequency neutral current vector 268, as in FIG. 8. That is, such a result may be viewed by the routines 42 and 242 as only a preliminary factor in identifying the existence of a mis-installed neutral current detection apparatus. The routines 42 and 242 could then, as a second step, and responsive to the detected situation in FIG. 8, additionally evaluate the harmonic current vectors as in FIGS. 9B and 10B as a further factor in identifying the existence of a mis-wired neutral current detection apparatus. If, as the second step, the routines 42 and 242 detect a scenario such as that which is depicted generally in FIG. 10B where the harmonic current vectors indicate a possible existence of a mis-installed neutral current detection apparatus, the routines 42 and 242 might then conclusively determine that the neutral current detection apparatus is mis-installed based upon the results in the fundamental frequency realm and in the harmonic frequency realm.

Figure 11:
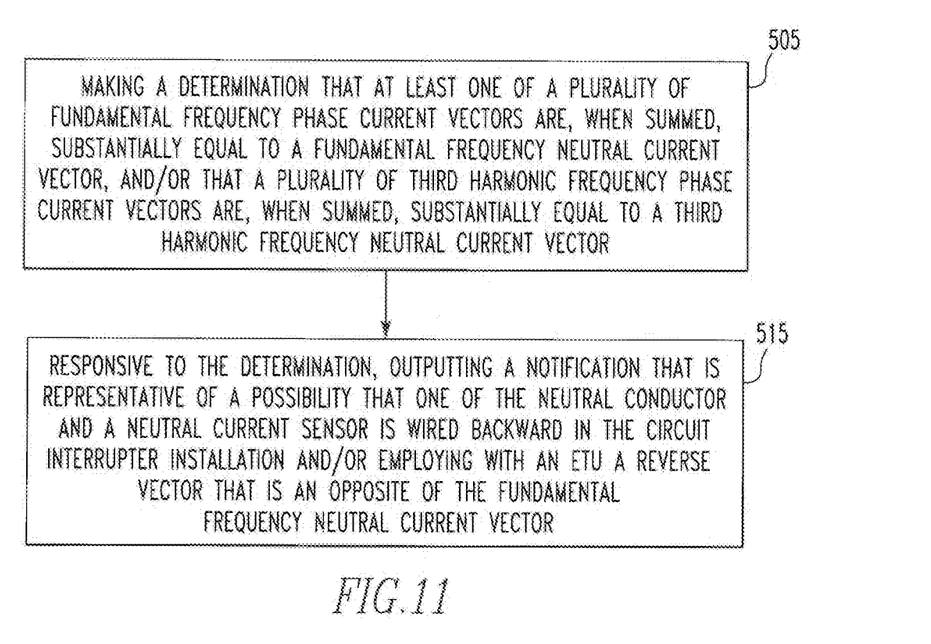
FIG. 11 is a flowchart depicting certain aspects of an improved method in accordance with the disclosed and claimed concept.

A flowchart is depicted in FIG. 11 which describes certain aspects of an improved method in accordance with the disclosed and claimed concept. Processing may begin, as at 505, where a determination is made that a plurality of fundamental frequency phase current vectors are, when summed, substantially equal to a fundamental frequency neutral current vector. Alternatively or additionally, it may be determined that a plurality of third harmonic frequency phase current vectors are, when summed, substantially equal to a third harmonic frequency neutral current vector. In such a situation, processing would continue, as at 515 where, responsive to the determination that was made at 505, the routines 42 and 424 would trigger the outputting of a notification that is representative of a possibility that one of the neutral conductor and a neutral current sensor is wired backward in the circuit interrupter installation. Alternatively or additionally, the routines 42 and 242 may take further action, such as employing with an ETU a reverse vector that is an opposite of the fundamental frequency neutral current vector. Other variations will be apparent.

Regardless of whether or not the neutral current detection apparatus 52 is reversed-installed, and whether or not the neutral vector 68 is reversed by the ETU 32 through the use of the reverse vector 280, the ETU 32 will trip the circuit interrupter 4 in the event of an actual ground fault. That is, if the sum of the phase vectors 64 with either the neutral vector 68 or the reverse vector 280 as they actually occur in the conductors really do not equal zero, the ETU 32 will detect a ground fault and will initiate a trip. Furthermore, it is noted that the disclosed and claimed concept involves looking at least at the startup detection of a reversed neutral current detection apparatus 52. In this regard, it is noted that a reverse-installed neutral current detection apparatus 52 will be at all times reversed, and that it would not suddenly become reversed a long time after installation and operation of the circuit interrupter installation 14. As such, the routines 42 and 242 might be configured such that the reverse vector 280 is usable to initially detect a reversed neutral current detection apparatus 52 only during some initial period of operation of the circuit interrupter installation 14.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method comprising:
   in a circuit interrupter installation having a plurality of poles, a neutral conductor, and an Electronic Trip Unit (ETU), determining:
      that a plurality of fundamental frequency phase current vectors are, when summed, substantially equal to a fundamental frequency neutral current vector, and
      that a plurality of triplen odd-numbered harmonic phase current vectors are, when summed, substantially equal to a triplen odd-numbered neutral current vector; and
   responsive to the determining, performing at least one of:
      outputting a notification that is representative of a possibility that one of the neutral conductor and a neutral current sensor is wired backward in the circuit interrupter installation, and employing with the ETU a reverse vector that is an opposite of the fundamental frequency neutral current vector.

2. The method of claim 1 wherein the determining that a plurality of triplen odd-numbered harmonic phase current vectors are, when summed, substantially equal to a triplen odd-numbered neutral current vector comprises determining that a plurality of third harmonic phase current vectors are, when summed, substantially equal to a third harmonic neutral current vector.

3. The method of claim 1 wherein the circuit interrupter installation is connected with a protected portion of a circuit, and further comprising:
inputting to the ETU the plurality of fundamental frequency phase current vectors;
inputting to the ETU the fundamental frequency neutral current vector;
employing with the ETU as the reverse vector an opposite of the fundamental frequency neutral current vector; and
analyzing on the ETU the plurality of fundamental frequency phase current vectors and the reverse vector for the potential identification of a fault condition on the circuit.

4. The method of claim 1, further comprising:
employing as the reverse vector the opposite of the fundamental frequency neutral current vector; and
monitoring on an ongoing basis with the ETU the plurality of fundamental frequency phase current vectors and the reverse vector for a possible detection with the ETU of a predetermined condition in the circuit interruption installation which, if detected, would cause the ETU to move the plurality of poles from an ON condition to at least one of an OFF condition and a TRIPPED condition.

5. The method of claim 1 wherein the circuit interrupter installation is connected with a protected portion of a circuit, and further comprising:
inputting to the ETU the plurality of triplen odd-numbered harmonic phase current vectors;
inputting to the ETU the triplen odd-numbered harmonic neutral current vector;
employing with the ETU as the reverse vector an opposite of the triplen odd-numbered harmonic neutral current vector; and
analyzing on the ETU the plurality of triplen odd-numbered harmonic phase current vectors and the reverse vector for the potential identification of a fault condition on the circuit.

6. The method of claim 1, further comprising:
employing as the reverse vector the opposite of the triplen odd-numbered harmonic neutral current vector; and
monitoring on an ongoing basis with the ETU the plurality of triplen odd-numbered harmonic phase current vectors and the reverse vector for a possible detection with the ETU of a predetermined condition in the circuit interruption installation which, if detected, would cause the ETU to move the plurality of poles from an ON condition to at least one of an OFF condition and a TRIPPED condition.

7. A circuit interrupter structured to be electrically connected with a protected portion of a circuit and further structured to be electrically connected with a neutral current sensor that is situated in proximity with a neutral conductor, comprising:

a plurality of poles structured to be electrically connected with a plurality of phase line conductors;
a plurality of phase current sensors situated in proximity to the plurality of poles;
an Electronic Trip Unit (ETU) electrically connected with the plurality of phase current sensors and being structured to be electrically connected with the neutral current sensor;
the ETU having a processor and a storage, the storage having stored therein a number of routines which, when executed on the processor, cause the circuit interrupter to perform operations comprising:
determining:
that a plurality of fundamental frequency phase current vectors are, when summed, substantially equal to a fundamental frequency neutral current vector, and
that a plurality of triplen odd-numbered harmonic phase current vectors are, when summed, substantially equal to a triplen odd-numbered harmonic neutral current vector; and
responsive to the determining, performing at least one of:
outputting a notification that is representative of a possibility that one of the neutral conductor and a neutral current sensor is wired backward in the circuit interrupter installation, and
employing with the ETU a reverse vector that is an opposite of the fundamental frequency neutral current vector.

8. The circuit interrupter of claim 7 wherein the determining that a plurality of triplen odd-numbered harmonic phase current vectors are, when summed, substantially equal to a triplen odd-numbered harmonic neutral current vector comprises determining that a plurality of third harmonic phase current vectors are, when summed, substantially equal to a third harmonic neutral current vector.

9. The circuit interrupter of claim 7 wherein the circuit interrupter installation is connected with a protected portion of a circuit, and further comprising:
inputting to the ETU the plurality of fundamental frequency phase current vectors;
inputting to the ETU the fundamental frequency neutral current vector;
employing with the ETU as the reverse vector an opposite of the fundamental frequency neutral current vector; and
analyzing on the ETU the plurality of fundamental frequency phase current vectors and the reverse vector for the potential identification of a fault condition on the circuit.

10. The circuit interrupter of claim 7, wherein the operations further comprise:
employing as the reverse vector the opposite of the fundamental frequency neutral current vector; and
monitoring on an ongoing basis with the ETU the plurality of fundamental frequency phase current vectors and the reverse vector for a possible detection with the ETU of a predetermined condition in the circuit interruption installation which, if detected, would cause the ETU to move the plurality of poles from an ON condition to at least one of an OFF condition and a TRIPPED condition.

11. The circuit interrupter of claim 7 wherein the circuit interrupter installation is connected with a protected portion of a circuit, and further comprising:
inputting to the ETU the plurality of triplen odd-numbered harmonic phase current vectors;

inputting to the ETU the triplen odd-numbered harmonic neutral current vector;

employing with the ETU as the reverse vector an opposite of the triplen odd-numbered harmonic neutral current vector; and analyzing on the ETU the plurality of triplen odd-numbered harmonic phase current vectors and the reverse vector for the potential identification of a fault condition on the circuit.

12. The circuit interrupter of claim 7, wherein the operations further comprise:

employing as the reverse vector the opposite of the triplen odd-numbered harmonic neutral current vector; and monitoring on an ongoing basis with the ETU the plurality of triplen odd-numbered harmonic phase current vectors and the reverse vector for a possible detection with the ETU of a predetermined condition in the circuit interruption installation which, if detected, would cause the ETU to move the plurality of poles from an ON condition to at least one of an OFF condition and a TRIPPED condition.

13. A method comprising:

in a circuit interrupter installation having a plurality of poles, a neutral conductor, and an Electronic Trip Unit (ETU), determining that a plurality of triplen odd-numbered harmonic phase current vectors are, when summed, substantially equal to a triplen odd-numbered harmonic neutral current vector; and responsive to the determining, performing at least one of:

outputting a notification that is representative of a possibility that one of the neutral conductor and a neutral current sensor is wired backward in the circuit interrupter installation, and employing with the ETU a reverse vector that is an opposite of the triplen odd-numbered harmonic neutral current vector.

14. The method of claim 13 wherein the determining comprises determining that a plurality of third harmonic phase current vectors are, when summed, substantially equal to a third harmonic neutral current vector.

15. The method of claim 13 wherein the circuit interrupter installation is connected with a protected portion of a circuit, and further comprising:

inputting to the ETU the plurality of triplen odd-numbered harmonic phase current vectors;

inputting to the ETU the triplen odd-numbered harmonic neutral current vector;

employing with the ETU as the reverse vector an opposite of the triplen odd-numbered harmonic neutral current vector; and analyzing on the ETU the plurality of triplen odd-numbered harmonic phase current vectors and the reverse vector for the potential identification of a fault condition on the circuit.

16. The method of claim 13 wherein the determining further comprises determining that a plurality of fundamental frequency phase current vectors are, when summed, substantially equal to a fundamental frequency neutral current vector.

17. The method of claim 13, further comprising:

employing as the reverse vector the opposite of the triplen odd-numbered harmonic neutral current vector; and monitoring on an ongoing basis with the ETU the plurality of triplen odd-numbered harmonic phase current vectors and the reverse vector for a possible detection with the ETU of a predetermined condition in the circuit interruption installation which, if detected, would cause the ETU to move the plurality of poles from an ON condition to at least one of an OFF condition and a TRIPPED condition.

* * * * *